(12) United States Patent
Russell, II et al.

(10) Patent No.: US 7,555,092 B2
(45) Date of Patent: Jun. 30, 2009

(54) SYSTEM AND METHOD FOR CONTINUOUS OPTIMIZATION OF CONTROL-VARIABLES DURING OPERATION OF A NUCLEAR REACTOR

(75) Inventors: William Earl Russell, II, Wilmington, NC (US); David Joseph Kropaczek, Kure Beach, NC (US); Glen Alan Watford, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 881 days.

(21) Appl. No.: 10/608,086

(22) Filed: Jun. 30, 2003

(65) Prior Publication Data

US 2004/0101083 A1    May 27, 2004

Related U.S. Application Data

(62) Division of application No. 09/683,004, filed on Nov. 7, 2001, now abandoned.

(51) Int. Cl.
*G21C 7/36* (2006.01)
(52) U.S. Cl. .................... 376/215; 376/216; 376/241
(58) Field of Classification Search ......... 376/215–218, 376/241, 242
See application file for complete search history.

(56) References Cited

U.S. PATENT DOCUMENTS

| | | | |
|---|---|---|---|
| 4,330,367 A | 5/1982 | Musick |
| 4,459,259 A | 7/1984 | Colley |
| 4,552,718 A | 11/1985 | Impink |
| 4,853,175 A | 8/1989 | Book, Sr. |
| 4,997,617 A | 3/1991 | Newton et al. |
| 5,009,833 A | 4/1991 | Takeuchi et al. |
| 5,023,045 A | 6/1991 | Watanabe et al. |

(Continued)

FOREIGN PATENT DOCUMENTS

DE          44 16 463          11/1994

(Continued)

OTHER PUBLICATIONS

Merriam Webster's Collegiate Dictionary, 10$^{th}$ Edition, 1993, p. 816.*

(Continued)

*Primary Examiner*—Rick Palabrica
(74) *Attorney, Agent, or Firm*—Harness, Dickey & Pierce, PLC (57) ABSTRACT

A system and method is provided for a continual updating of the optimization of multiple operational control-variables during the operation of a nuclear reactor over a plurality of fuel cycles. A networked computer system includes one or more hosts programmed to execute an optimization process to identify and make changes in quantitative values of operational control-variables that result in improved efficiency and operational flexibility. Optimization and updating of operational control-variables may proceed selectively under manual control for inputting specific optimization constraints and reactor state-point information or may proceed autonomously through a repetitive performing of the optimization process based upon a predetermined user-defined strategy stored on the network. Communications between users and networked processors is facilitated by use of a TCP/IP server connected to the Internet so that portions of the optimization process may be conducted contemporaneously at remote locations and/or the results made accessible to users via conventional browser enabled computers.

11 Claims, 9 Drawing Sheets

U.S. PATENT DOCUMENTS

| | | | |
|---|---|---|---|
| 5,091,139 | A | 2/1992 | Chao et al. |
| 5,171,516 | A | 12/1992 | Iwamoto |
| 5,267,346 | A | 11/1993 | Maruyama et al. |
| 5,272,736 | A | 12/1993 | Wolters, Jr. et al. |
| 5,309,485 | A | 5/1994 | Chao |
| 5,311,562 | A | 5/1994 | Palusamy et al. |
| 5,392,320 | A | 2/1995 | Chao |
| 5,438,527 | A | 8/1995 | Feldbaumer et al. |
| 5,530,867 | A | 6/1996 | Beran |
| 5,631,939 | A | 5/1997 | Haraguchi et al. |
| 5,636,328 | A | 6/1997 | Kautz et al. |
| 5,726,913 | A | 3/1998 | Grimsrud |
| 5,781,430 | A * | 7/1998 | Tsai ............................. 700/28 |
| 5,790,616 | A | 8/1998 | Jackson |
| 5,790,618 | A | 8/1998 | Fawks, Jr. |
| 5,793,636 | A | 8/1998 | Cooney et al. |
| 5,812,622 | A | 9/1998 | Chang et al. |
| 5,855,009 | A | 12/1998 | Garcia et al. |
| 5,859,885 | A | 1/1999 | Rusnica et al. |
| 5,912,933 | A * | 6/1999 | Shaug et al. ................ 376/216 |
| 5,923,717 | A | 7/1999 | Fawks, Jr. |
| 5,940,816 | A | 8/1999 | Fuhrer et al. |
| 6,031,984 | A | 2/2000 | Walser |
| 6,272,483 | B1 | 8/2001 | Joslin et al. |
| 6,311,313 | B1 | 10/2001 | Camporese et al. |
| 6,345,240 | B1 | 2/2002 | Havens |

FOREIGN PATENT DOCUMENTS

| | | |
|---|---|---|
| DE | 198 45 988 | 4/1999 |
| EP | 0 786 782 A1 | 7/1997 |
| EP | 0 823 712 A1 | 2/1998 |

OTHER PUBLICATIONS

"Winning Strategies for Maintenance Optimization at U.S. NPPs," Nuclear Plant Journal Editorial Archive, Mar. 3, 2000.*

Pryor, Jr., "The Economics of Nuclear Energy," Nuclear Plant Journal Editorial Archive, Sep.-Oct. 1998.*

Knollenberg, "The Energy Supply for the United States & the Role of Nuclear Energy," Remarks given at the University of Michigan, Apr. 20, 2000.*

Dozier et al., "Winning Strategies for Maintenance Optimization at U.S. NPPs," Nuclear Plant Journal Archive, Mar.-Apr. 1999.*

Hamida, S. Ben et al. "The need for improving the exploration operators for constrained optimization problems." Proc. Of the 2000 Congress on Evolutionary Computation, San Diego, USA, 1989.

Michalewicz, Zbigniew et al. "Genocop III: A Co-evolutionary Algorithm for Numerical Optimization Problems with Nonlinear Constraints." Proc. Second IEEE Intl. Conf. Evolutionary Computation, D.B. Fogel (ed). IEEE Press, pp. 647-651, 1991.

Schoenauer, Marc et al. "Evolutionary Computation at the Edge of Feasibility." Proc. $4^{th}$ Conf. Parallel Problems Solving from Nature, W. Ebeling and H. M. Voigt (eds.), Springer-Verlag, pp. 573-580, 1996.

Bäck, Thomas et al. "A Survey of Evolution Strategies." Proc. $4^{th}$ Intl. Conf. Genetic Algorithms, R.K. Belew and L.B. Booker (eds.), Morgan Kauffman, pp. 2-9, 1991.

Joines, Jeffrey A. et al. "On the Use of Non-Stationary Penalty Functions to Solve Nonlinear Constrained Optimization Problems with GA's." Proc. $1^{st}$ IEEE Intl. Conf. Evolutionary Computation, D.B. Fogel (ed.) IEEE Press, pp. 579-584, 1994.

Eiben, A. E. et al. "SAW-ing EAs: adapting the fitness function for solving constrained problems." *New Ideas in Optimization*. McGraw-Hill, London, D. Corne, M. Dorigo, F. Glover (eds.), pp. 389-402, 1999.

Coit, David W. et al. "Adaptive Penalty Methods for Genetic Optimization of Constrained Combinatorial Problems." Informs Journal on Computing, 8(2): 173-182, 1996.

Moore, Brian R. et al. "FORMOSA-B: A Boiling Water Reactor In-Core Fuel Management Optimization Package." Nuclear Technology, vol. 126, pp. 153-169, May 1999.

Karve, A.A. et al. "FORMOSA-B: A Boiling Water Reactor In-Core Fuel Management Optimization Package II," *Nucl. Technol.*, 131, 48-68 (2000).

Hadj-Alouane, A.B. et al. "A Genetic Algorithm for the Multiple-Choice Integer Program." Operations Research, 45 (1), pp. 92-101, 1997.

Homaifar, A. et al. "Constrained Optimization via Genetic Algorithms" Simulation 62 (4), pp. 242-254, 1994.

CRC Handbook of Mathematical Sciences, $5^{th}$ Edition, William H. Beyer, CRC Press, 1985.

Karve et al. "Effectiveness of BWR Control Rod Pattern Sampling Capability in the Incore Fuel Management Code FORMOSA-B", *M&C*"99, Sep. 1999, Madrid Spain, pp. 1459-1468.

* cited by examiner

Fig. 1A

Example Reactor Control-Variable Optimization System

Fig. 1B
Data Processing Overview of
Example Control-Variable Optimization System Fig. 2
Current Core Database Fig. 3
Operational Strategy Change Fig. 4
Statepoint Collection Fig. 5
Optimization Inputs Database Fig. 6A
Optimization Fig. 6B
Example Optimization Engine

Fig. 7

Example Optimization Outputs Database Content

SYSTEM AND METHOD FOR CONTINUOUS OPTIMIZATION OF CONTROL-VARIABLES DURING OPERATION OF A NUCLEAR REACTOR

This application is a divisional application Ser. No. 09/683,004 filed on Nov. 7, 2001 now abandoned which is hereby incorporated by reference in its entirety.

BACKGROUND OF INVENTION

This invention generally concerns nuclear reactor operations optimization and management. More particularly, the present invention is directed toward identifying optimal reactor plant operational settings and an ongoing management strategy that incorporates a consideration of plant-specific constraints for a multiplicity of operational control-variables such as, for example, control blade positioning, cycle flow strategy, location of sequence exchanges, and other critical-to-quality control variables relevant to operation of a nuclear reactor plant throughout one or more reactor core refueling cycles.

A nuclear reactor plant includes many different individual components that have dynamic characteristics which may affect any given strategy devised for eliciting a more efficient operation of the reactor core. For example, a nuclear reactor core has many, e.g., several hundred, control blades which each require position and location identification throughout the direction of one or more cycles of fuel depletion. In addition, many other controllable elements and factors that affect the reactivity and overall efficiency of a reactor core must also be taken into consideration if one is to design or develop an effective control strategy for optimizing the performance of a reactor core at a particular reactor plant. Such variable "operational controls" (also referred to herein as "independent control-variables") include various physical component and controllable operating conditions configurations within the reactor that can be individually adjusted or set before or during operation of the reactor.

For example, the locations of the various control blades within the reactor core are one of the many independent controllable variables that significantly affect the generated power output and overall efficiency of operation of a reactor. Other operational controls include such controllable variables as "core flow" (rate of water flow through the core) and the timing of the sequence exchange or exposure interval at which groups of control blades are changed. Each of these so called variable operational controls may be considered as an independent "control-variable" which has a measurable effect on the overall performance of the reactor core. Due to vast number of possible different operational values and combinations of values that these independent control-variables can assume, it is both a formidable challenge and a very time consuming task using conventional computer-aided methodologies to attempt to analyze and optimize most if not all of the individual influences that may have an impact core reactivity and performance.

In order to furnish and maintain a required energy output, the reactor core is periodically refueled with fresh fuel bundles. The duration between one refueling and the next is commonly referred to as a "fuel cycle", "core cycle", or "cycle" of operations and, depending on the particular reactor plant, is on the order of twelve to twenty-four months. During the course of a cycle, the excess energy capability of the core, defined as the excess reactivity or "hot excess", is controlled by core coolant (water) flow and the control blades. Typically, a reactor core contains many such control blades which are fit between selected fuel bundles and are axially positioned within the core.

The total number of control blades utilized in a reactor varies with core size and geometry, and is typically between fifty (50) and one-hundred and fifty (150). The axial position of control blades (e.g., fully inserted, fully withdrawn, or somewhere in between) is based on the need to control excess reactivity and to meet other operational constraints, such as thermal or reactivity margins. For each control blade, there may be, for example, twenty-five or more possible axial positions and twenty-five or more "exposure" (duration of use) steps. Considering symmetry and other requirements that may reduce the number of control blades that are available for application at any one time, there are more than several million existing combinations of control blade positions possible for even the simplest arrangement. Larger arrangements may have more than a googol ($1 \times 10^{100}$) possible configurations. However, only a small fraction of these configurations will satisfy all the applicable design and safety constraints, and of those, only a smaller fraction prove economical. Moreover, the axial positioning of control blades also influences core cycle energy and potential thermal limits. Since it is desirable to maximize the core-cycle energy in order to minimize nuclear fuel cycle costs, developing an optimum control blade positioning strategy is yet another type of independent control-variable optimization problem that should be taken into consideration when attempting to optimize operational management strategies.

Historically, cycle operations and core management, including control blade positioning, sequence exchange lengths, and core flow selection, are determined on a "trial-and-error" basis based primarily on the past experiences of the reactor engineers. Due to circumstances that require a rapid response to changing plant operating conditions, a reactor engineer may be faced with the formidable challenge of specifying values for over one-hundred or more independent control variables within a very short time frame. If a particular design constraint is not satisfied by an identified arrangement, then the arrangement is modified and a computer simulation is run. Because of the relatively long computer simulation time required for assessing the impact of a change in the value of even a single given independent control-variable, man-weeks of human and computer resources are typically required before an appropriate operational strategy is identified using this procedure. Moreover, using this trial-and-error approach, once a operation strategy that satisfies all identifiable design and safety constraints is determined, it may turn out that the identified arrangement does not provide the best cycle-energy economics. In that case, the trial-and-error selection process must continue until the engineers believe that an optimum operational strategy has been identified. In practice, however, it is very possible that a particular core arrangement that is inconsistent with past experience may actually be the optimum operational strategy to use.

Numerous systems have attempted to address various aspects of the above problem through the implementation of various improvements in display interfaces to the reactor engineer (e.g., see U.S. Pat. Nos. 5,859,885, 4,853,175 and 5,812,622), improvements in data management of information (e.g., see U.S. Pat. Nos. 5,793,636 and 4,459,259), improvements towards reactor operation alarms (e.g., see U.S. Pat. Nos. 5,311,562 and 5,023,045), and improvements in the instantaneous monitoring of the reactor (e.g., see U.S. Pat. Nos. 4,997,617, 5,309,485; 5,392,320 and 5,091,139). Although such efforts have somewhat improved the real-time monitoring and display of information required for operation of a nuclear reactor, none provide the tools needed for determining the appropriate settings of the independent control variables for an entire full cycle or longer. Moreover, the above prior art systems all rely significantly on a manual input/data selection process in the development of any operational strategy.

There have been a few attempts to provide automated predictive capabilities for one or more aspects of the above problem through the use of so called "decision tree", or "neural net" technologies. For example, U.S. Pat. No. 4,552,718 to Impink, Jr. et al. discloses a system for monitoring the operational status of a nuclear reactor that provides indication of "off-normal" conditions, and a path of operation by which the reactor can be restored to normal conditions by way of "decision tree" logic. Such "decision tree" technologies are capable of providing correct logic to a limited number of independent variables when adequate supporting data is provided such that the cause and effect relationships are well defined, such as global reactor problems and consequent human responses. However, optimization of all current and future independent variables as described above for operation of a boiling water reactor (BWR) for entire full cycle of operations essentially requires an infinite number of cause/effect relations and is not particularly feasible. Similarly, U.S. Pat. No. 5,009,833 to Takeuchi et al. describes an expert system rule based optimization approach. Much like "decision tree" technologies, "expert system" rule based technologies are only as good as the rules provided to the system. Consequently, while these technologies are capable of identifying global reactor issues and the subsequent necessary human response, their application is often not practical and does not include an application for a continuous operations optimization of a working nuclear reactor.

In another example, U.S. Pat. No. 5,790,616 to R. O. Jackson et al., issued Aug. 4, 1998, describes an early attempt to perform optimization on control blade locations for a nuclear reactor. In this example, optimizations are performed using a genetics based algorithm at a single time sequence. Once the preferred rod patterns at a given time sequence are determined, the rods are established and the following time step is studied. A heuristic assumption is integrated into the system by assuming that the "best" set of rod patterns for the cycle are the rod patterns that provide for the lowest axial peak in the core. Although this heuristic assumption enabled the Jackson et al. system to optimize on a subset of the total number of independent variables (approximately 6-12), the assumption precludes the obtainment of a true optimal solution. Moreover, on many BWR reactors, extremely hard bottom burns at the beginning of cycle (BOC) can lead to conditions at the end of cycle (BOC)—where thermal limits are excessive and require the reactor to lower power levels to maintain safe operation. Consequently, the system disclosed by Jackson et al. provides neither optimal nor potentially usable solutions.

To more adequately address the above problems, it would be most desirable to have a very efficient computer system arrangement that would be capable of performing a comprehensive nuclear reactor plant operations optimization process that would identify most, if not all, of the appropriate changes/modifications in operational control-variables that are needed to result in an improved fuel cycle efficiency, better global reactor economics and enhanced operational flexibility.

SUMMARY OF INVENTION

In one aspect, the present invention is a system and method for identifying the best possible quantitative values for one or more operational control-variables that are collectively associated with the functioning and control of a nuclear reactor core and for determining an optimal operational strategy for one or more refueling cycles of the core. In another aspect, the present invention is a system and method for updating and maintaining an optimal operational strategy for a nuclear reactor continuously during the operation of the reactor over a duration of multiple refueling cycles. In this aspect, once a set of preferred optimization constraints are identified, the system effectuates a continued optimization of reactor operations throughout the duration of a multiplicity of fuel cycles by effectively continuously providing updated reactor operations parameters (optimized control-variables) which may be directly implemented in controlling the reactor to result in a more flexible, economical and safe manner of operation.

In an example embodiment of the present invention, a system and method for optimizing multiple operational control-variables during operation of a nuclear reactor comprises a networked computer system that includes one or more host processors or computers programmed to execute an optimization process that identifies and/or implements changes to one or more of the many operational control-variables of a reactor plant in order to improve reactor fuel cycle efficiency, global reactor economics, and enhance operational flexibility. In a further aspect, the present invention encompasses a computer network system with communications enhanced by connection to the Internet so as to distribute processing loads and to facilitate access and control of the optimization process from a wide variety of locations.

In the example embodiment, optimization and updating of operational control-variables may proceed selectively under manual control for inputting specific optimization constraints and reactor state-point information or may proceed autonomously through a repetitive performing of the optimization process based upon a predetermined user-defined strategy stored on the network. Using a graphics input and display user-interface (GUI), a reactor design specialist/engineer may selectively input and review various independent variable selections and their resulting dependent variable responses, or change various optimization constraints and controls in pursuit of alternative design strategies. As will become evident by the following description, once a set of preferred optimization constraints are identified, the present invention may also be used to effectuate automatic repetitive adjustments to reactor controls to effectively provide continuous optimizations in reactor operation over the duration of one or more reactor fuel cycles.

DETAILED DESCRIPTION

The following description is directed toward a presently preferred embodiment of the present invention, which may be implemented as a remote user application running, for example, under the Microsoft Windows 2000 operating system on Intel Pentium hardware with WEB for communications, Oracle for database structure, and UNIX for a database operating system. The present invention, however, is not limited to any particular computer system or any particular environment. Instead, those skilled in the art will find that the system and methods of the present invention may be advantageously applied to any environment requiring continuous optimization of multiple control-variable critical processes or systems, including industrial, chemical, mechanical, nuclear, and biotech. Moreover, the invention may be embodied using a variety of computer operation system platforms, including UNIX, LINUX, Mac OS, Open VMS, Solaris, SCO UNIX, Digital UNIX, HP UNIX, AIX, OSF, DOS, OS/2, BSD, Plan-9, and the like. Similarly, the invention may be implemented using a variety of different hardware environments, including X86, Power PC, Strongarm, Alpha, Sparc, RISC, Cray, and the like. Therefore, the particular description of example embodiments of the invention provided herein is for purposes of illustration and not limitation.

An example embodiment of the system of the present invention utilizes a network of independent processors for contemporaneously conducting multiple simulations of a reactor core operating under different conditions and constraints. Each simulation is representative of a different virtual operational case and comprises different sets of values for various reactor core operational parameters (i.e., the independent control-variables). The reactor core simulations provide output data that is indicative of selected performance parameters which reflect the operational state of the reactor throughout the duration of a reactor core fuel cycle. Once all reactor core simulations are completed, the simulation output data for each control-variable case is accumulated, normalized and mapped by a host processor to corresponding high-order polynomials that fit the reactor core simulation results data for each control-variable case. Coefficients that uniquely describe each polynomial are collected in an associated memory device as a multidimensional data array that serves as a type of virtual "response surface".

In this manner, the virtual response surface acts as a cyber-workspace and repository for storing resultant output data from many control-variable case simulations. The polynomials are then used to predict quantitative values (i.e., dependent variables) for the reactor performance parameters over a limited range of independent control-variable values. The predicted performance parameter values from each polynomial predictor are compared using an objective function to determine which particular associated independent control-variable(s) is likely to produce the greatest improvement. Another core simulation using the identified values is then performed to provide calibration of the polynomial predictors and to calibrate the polynomial coefficient data in the response surface with the simulation process.

Upon completion of the above global optimization process, optimized parameter values for the independent variables associated with different reactor operations (e.g., rod patterns, core flow, and sequence exchange times) may be digitally communicated via, for example, LAN/WAN, the Internet or other network facilities for using and displaying at various locations. For example, a Web-browser enabled computer connected to the Internet may be utilized as an output display device/terminal and may also serve as one of the optimization system processors as well as one of the reactor core simulation machines (core simulator). Through this distributed computing and display arrangement, system users at various locations may view preferred independent variable selections and resulting dependent variable responses, and/or change various optimization constraints and controls for studying and implementing alternative operation strategies.

In one aspect of the present invention, quantitative values for several thousand operational control-variables produced by an optimization process host processor and one or more networked reactor core simulators are stored in an network accessible storage device for maintaining a database of both past and projected reactor operation information. A reactor design specialist may then study such information to determine practical ranges and limits that constitute allowable and safe operation of the reactor. A collection of permissible ranges for the operational control-variables is then identified and stored in the general database as a preferred operational strategy for a given reactor. Although, a given operational strategy may remain as the preferred strategy for the duration of an entire fuel cycle of a particular reactor, the present invention also enables the design specialist/engineer to make on-the-fly modifications to the stored strategy should the need occur.

For example, operational strategy changes may occur due to a desire for a more economically efficient reactor performance, changes in the NRC licensing requirements, or bad predictions by the design simulators. Once a design strategy is identified, an optimization process that provides recommendations for operation control variable selection. After the optimization process has completed execution, the predicted reactor performance data is stored in a general database accessible as part of the system network. Optimization output results including recommended values for the operational control-variables, resulting projected dependent variable values, comparisons of the projected values to limit values and the like are computed and made selectively available as an output.

Once a set of initial strategy definitions have been stored in an accessible database, the present invention may also be used to schedule periodic re-optimizations on a regular or continual basis. Such automatically performed re-optimizations allow differences between expected simulator biases to be constantly re-calibrated to actual simulator results. Frequent such re-optimizations performed based on the most current reactor state-points, results in more accurate projections of future operations. The duration of the automatic re-optimizations is only limited by the speed of the individual host processors used in performing the optimization computations and the rate at which the general database is updated with current reactor operational data.

Figure 1A:
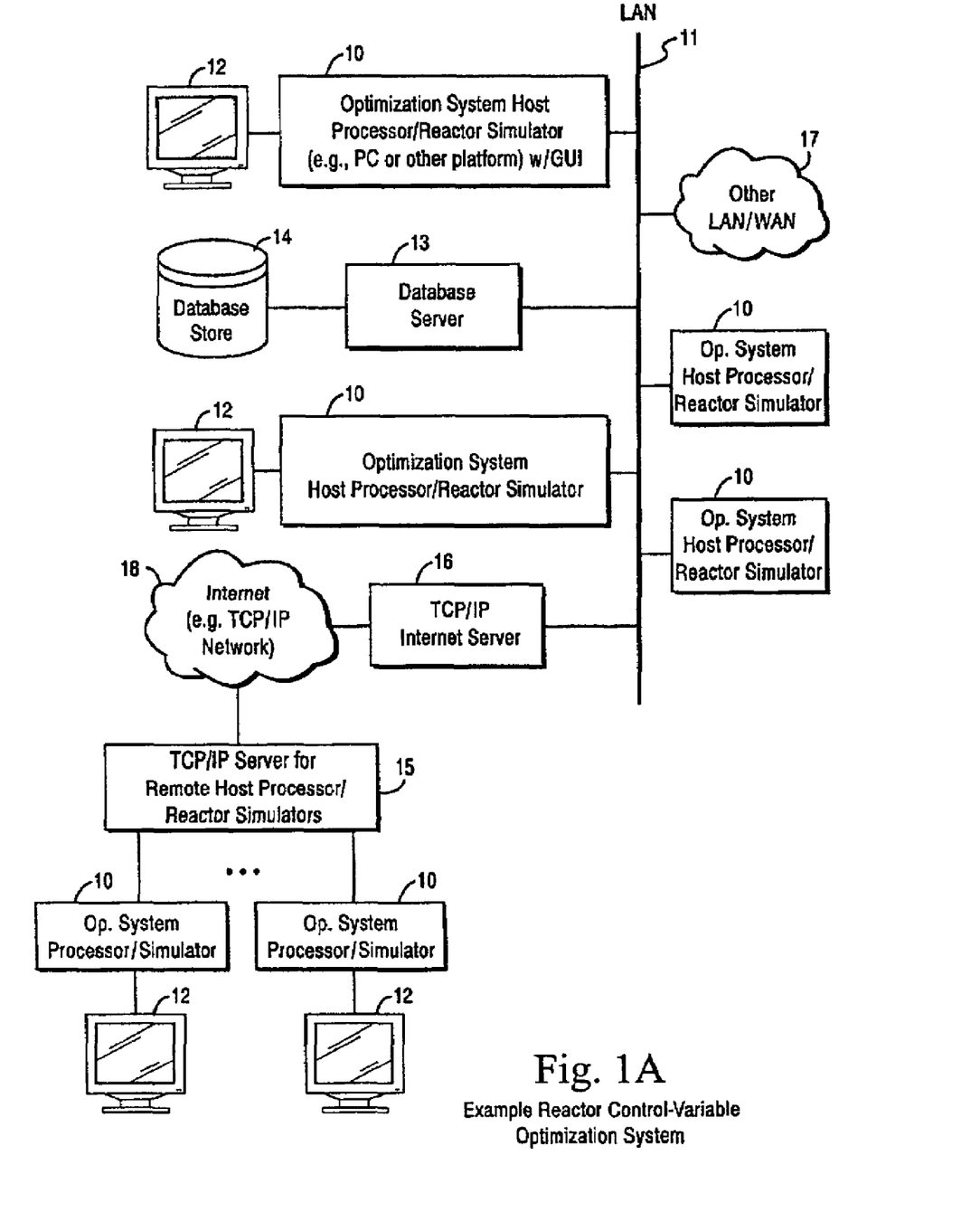
FIG. 1A is a block diagram illustrating an example reactor control-variable optimization system.

FIG. 1A shows an example hardware arrangement of components for providing a reactor control-variable optimization system. In this example, one or more host processors 10 are coupled via a local area network (LAN) 11, a wide area network (WAN) 17 or the Internet (TCP/IP network). Each processor 10 may host reactor simulation software and/or client software for accessing and displaying information provided via a graphic user interface (GUI) on a display device (12) coupled to the processor. The optimization system components may include one or more database storage devices 14 accessed via, for example, one or more database servers 13. In addition, the optimization system may include remotely located host processors and/or database storage devices in communication with local LAN 11 via connection to a remote LAN/WAN 17 or over the Internet, for example, via TCP/IP servers 15 and 16.

A beneficial aspect of the present invention comes from the implementation of a system configuration that uncouples the graphical user interface (GUI) from the location of the computational environment where the optimization calculations are actually performed. For example, in an example embodiment of the present invention, a TCP/IP network, LAN, WAN or a combination these and other of digital communications infrastructures may be used to connect a computer or terminal having a graphical user interface to one or more database storage devices and processors/servers that perform the optimization process computations.

Figure 1B:
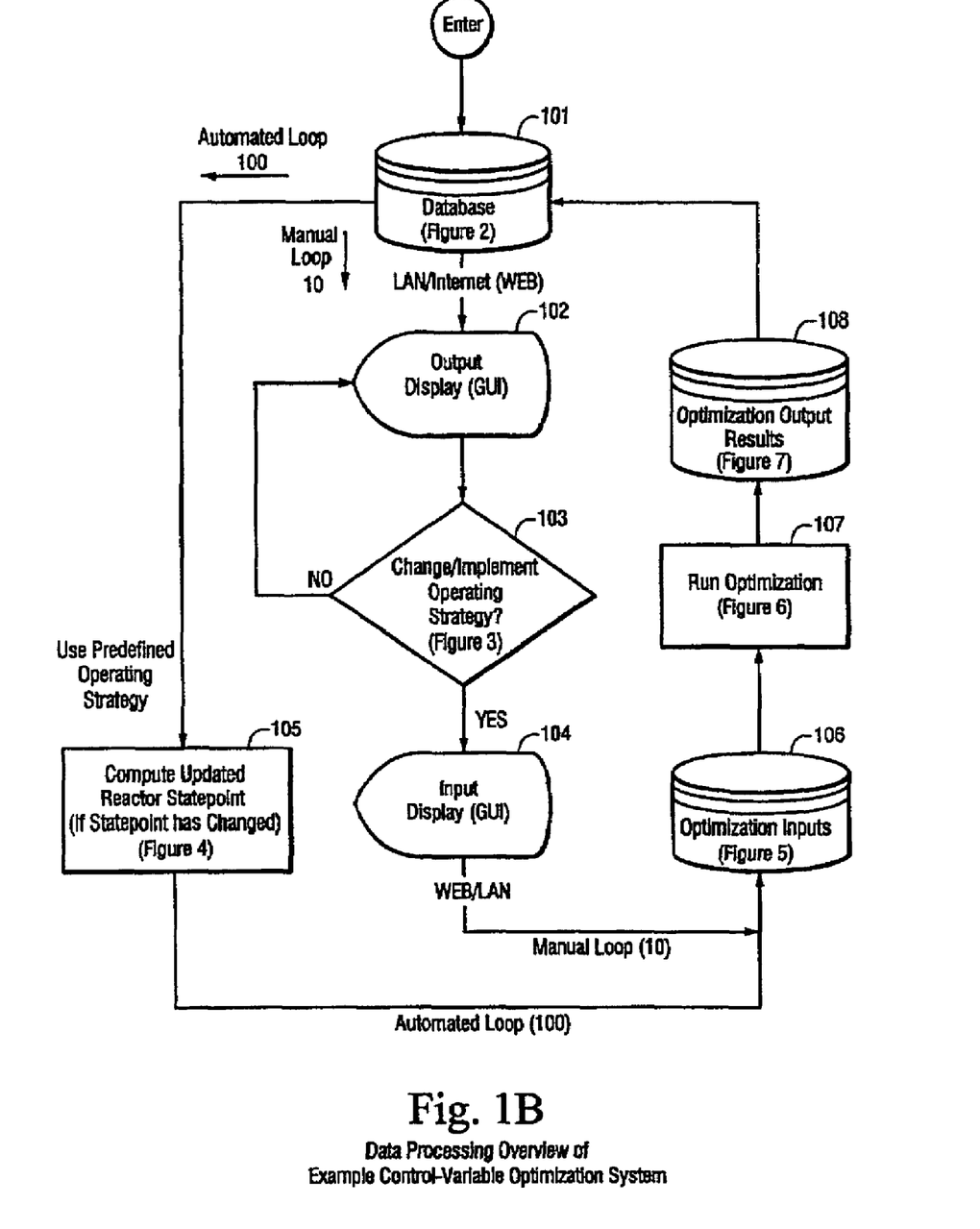
FIG. 1B is a flowchart illustrating the two fundamental operational processing loops and a general data processing overview of an example system for optimization of multiple operational control-variables of a nuclear reactor in accordance with the present invention.

Referring now to FIG. 1B, a data processing flow diagram illustrates an example system for continuous optimization of multiple operational control-variables of a nuclear reactor in accordance with the present invention. The flowchart shown provides a general processing overview of an example system and illustrates two fundamental operational processing modes: a manual input constraint definition process (manual loop 10) and an automated optimization updating process (automated loop 100). By way of the manual process, updated results from a general database 101 may be viewed (102) by using a conventional display device (12) driven, for example, by a graphical user interface (GUI). General database 101 may consist of a central data base (as shown in the Figures) located on a single storage device or it may be a distributed data base located on multiple storage devices distributed throughout the optimization system network. Should a user (e.g., a design engineer) desire to modify or test an alternative operating strategy (103), such modifications may also be initiated and input (104) through the GUI. Although though various features of the GUI are described herein, details of the GUI driving software and other conventional GUI features that may be appropriate for use with the optimization system of the present invention may be readily developed without undue experimentation by a programmer of ordinary skill and, as such, are not discussed in detail herein.

Once selected optimization inputs have been modified, the various inputs are stored, for example, within optimization inputs database 106, which may be distinct from, or form a portion of, general database 101. Next, using the appropriate inputs stored in optimization inputs database 106, an optimization program 107 determines appropriate values for the independent control-variables and provides resulting values for all dependent variables. This optimization output 108 is stored to general database 101 for subsequent access and viewing as described above. Optimized values for operational control variables (e.g., rod pattern, flow strategy, sequence exchange times, sequence lengths, etc.) are provided as displayable outputs for use in the operational management of the nuclear reactor core.

As previously mentioned, one aspect of the present invention provides automatic updates to control-variables and automatically updates the status of a currently operating reactor based on a predefined preferred operating strategy. To implement this automated aspect of the invention, an updated nuclear reactor state-point is first obtained from a general database 101 (loop 100). The updated state-point data may be produced, for example, from actual monitoring devices and sensors on the reactor or as a result of simulating reactor operations by a conventional reactor simulator process or program provided on one or more host processors 10 connected via networks 11, 17 or 18 of FIG. 1A. The updated reactor state-point information is then used to make modifications to various optimization input parameters stored in Optimization Inputs database 106 based on an operational strategy set up during the manual input loop process (10).

Figure 2:
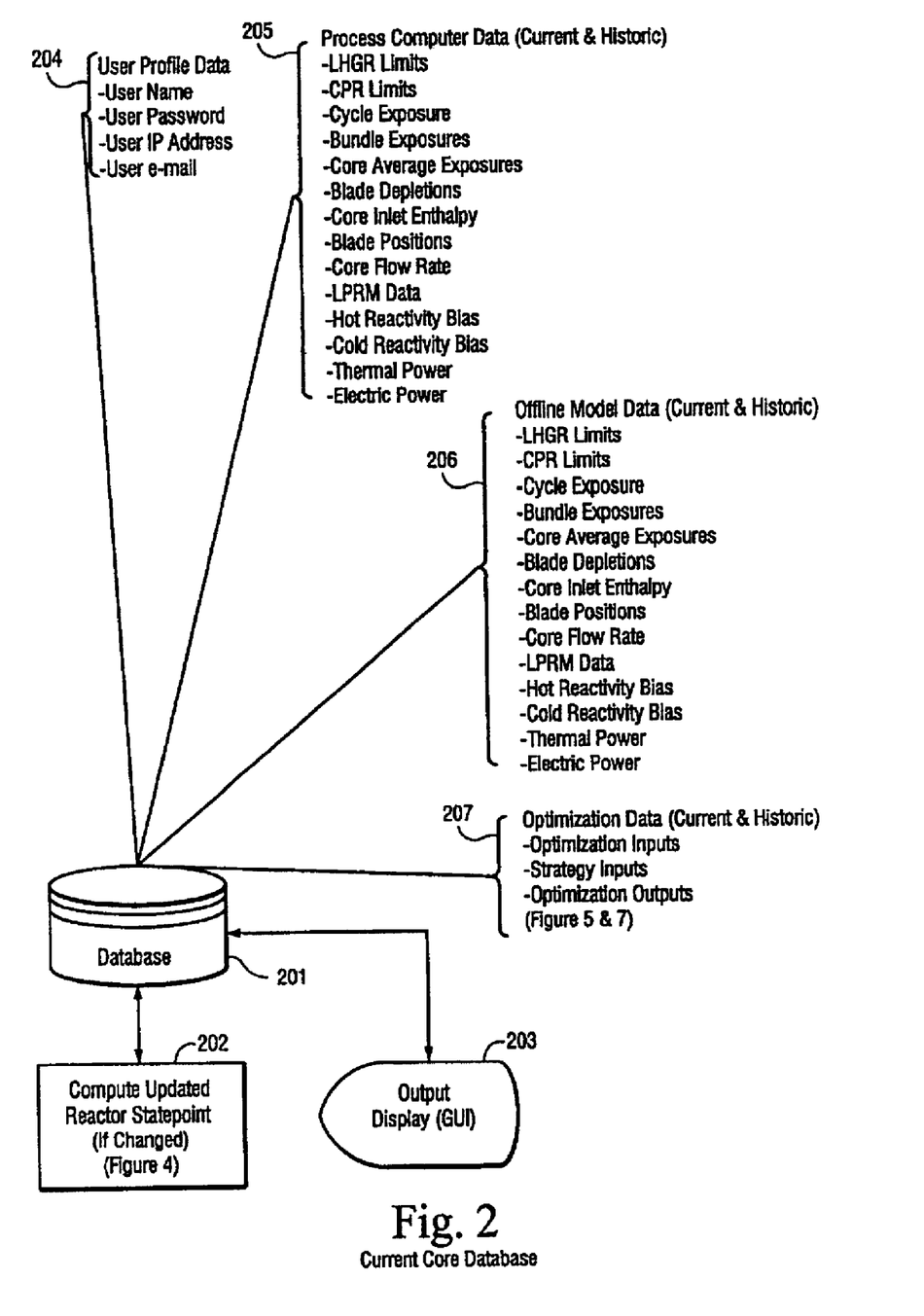
FIG. 2 is a block diagram illustrating exemplary groups of information and parameter types stored on a general database storage device of the present invention.

Referring now to FIG. 2, a block diagram illustrates some example information (content) of a general (central) database (201) used for of the present invention. In this example, the information in general database 201 may be stored, for example, using one or more mass data storage devices interconnected via the digital communications network of the system or it may reside entirely on a single centralized storage device. In this example embodiment, the general database also includes at least four basic types of data items: 1) user profile data 204; 2) process computer data 205; 3) offline model data 206; and 4) optimization data 207. User Profile Data 204, for example, enables the system to control access of each user to various information, while preventing access to certain predetermined restricted data. Because a centralized general database may include information for a multitude of nuclear reactors owned by a plurality of different companies, controlled access to such data may be implemented, for example, by requiring a password for access or some other conventional security access arrangement. Security may be enhanced, for example, by requiring identification of the user IP address and allowing only specific user and specific machine access privileges. Other profile data information may include, for example, cumulative user performance measures of the optimization performance status. Such information may provide insight towards additional user training requirements of specific users and may also be used to monitor optimization value for a specified user and reactor.

The second type of data stored in general database 201 is Process Computer Data 205. This process computer data is the results of actual reactor plant monitoring of operational parameters such as: LHGR results, CPR results, cycle exposure, bundle exposures, core average exposures, blade depletions, core inlet enthalpy, blade positions, core flow rate, LPRM data, hot reactivity bias, cold reactivity bias, thermal power, electric power, etc. Such data is highly related to individual reactor plant instrumentation and, therefore, is considered as the "official" operation status of a particular nuclear reactor.

Somewhat analogous to Process Computer Data 205 is the current and historical "Off-line" Model Data 206. This data is similar, although not exactly the same, to Process Computer Data 205. Although design inputs may be identical, differences may occur in reactor performance outputs due to various reactor simulator biases and other uncertainties. Moreover; different reactor simulators may have been used in producing the Process Computer Data and the Off-line Model Data. Such different reactor simulators may implement the simulation of reactor operations by using substantially different computational methodologies. Consequently, output from these reactor simulators (even though provided with identical input information) will often result in substantially different reactor output data. Because the optimization execution begins from the off-line simulator model, incorporation of the differences between Process Computer Data 205 and Off-line Model Data 206 is utilized to provide calibration to accommodate differences between different simulation models. Using such prudent calibration between different types of data allows optimization predictions for future operation to be more accurate and useful.

The third type of data stored in general database 201 is Optimization Data 207. This type of data includes both current and historic information used for optimization input specification, strategy definition inputs, and optimization output results. (Optimization Inputs and Optimization Outputs are discussed in greater detail below with respect to FIG. 5, FIG. 6A, FIG. 6B, and FIG. 7). Database 201 may be accessed and/or updated both manually by a user through GUI 203 and automatically by the system during automated processing 202.

Figure 3:
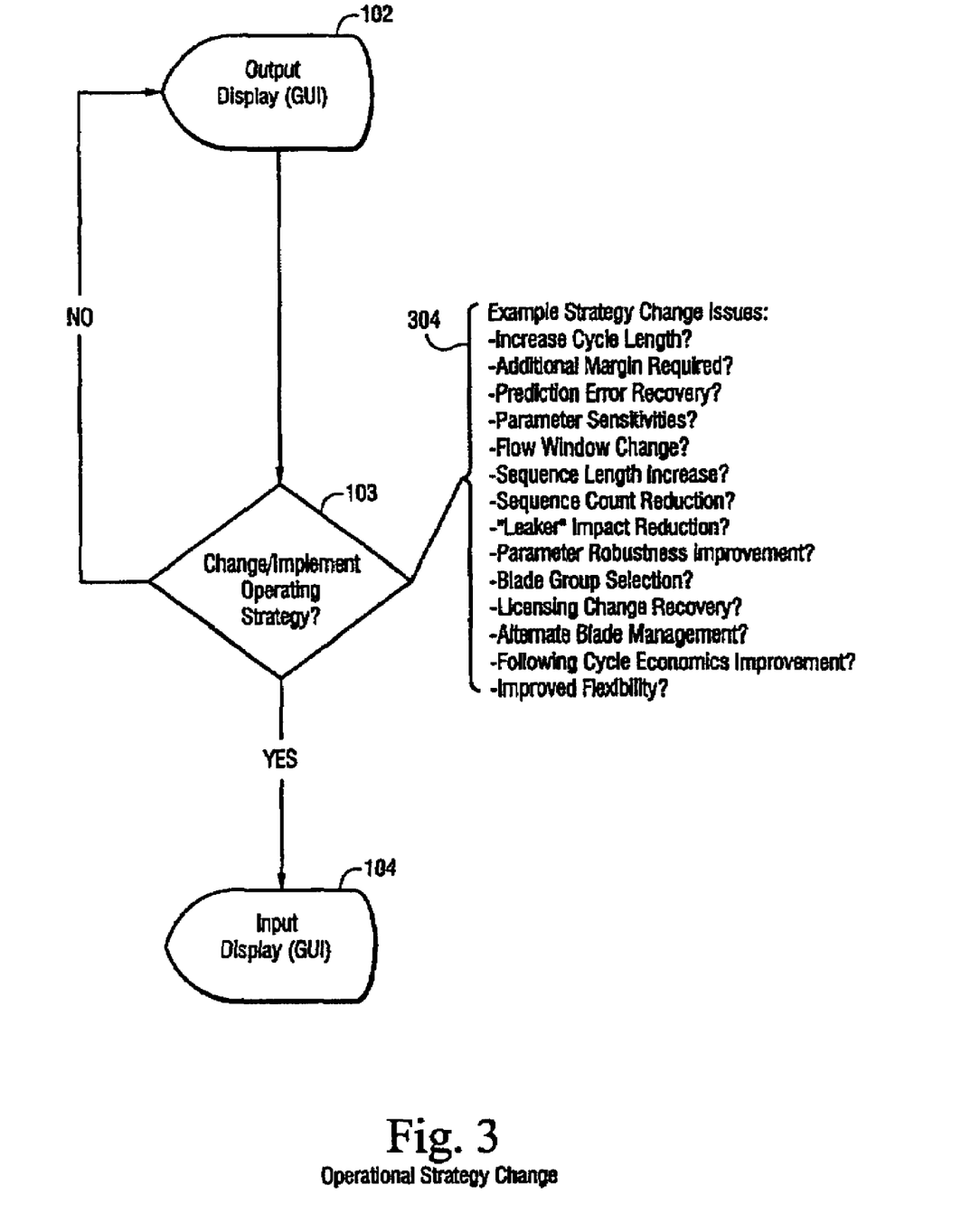
FIG. 3 is a block diagram illustrating some example operational strategy change issues.

FIG. 3 provides an example list (304) of typical operational strategy issues that are likely to be considered, for example, by an engineer/operator when deciding whether a change in operating strategy or a new operation strategy should be implemented. For example, after viewing core performance from the process computer data, core performance from a simulation model, and/or optimization inputs and outputs for projected future optimization through the graphical user interface (102), one may desire to implement changes (103) to the predefined operational inputs strategy definition using the GUI (104). The GUI may also provide a selection menu listing for editing or selecting predetermined strategy profiles and/or optimization inputs for affecting a change in operational strategy and the equivalent constraints. Strategy changes affecting predetermined values of parameters may be implemented, for example, via GUI 104. Listed immediately below are a few example reasons why implementing one or more strategy constraint change may be desirable:
  to increase reactor full-power cycle length;
  to provide additional reactor margin if needed for thermal limits or reactivity margin limits;
  to recover from erroneous predictions produced by the reactor core simulator/simulation runs;
  to perform sensitivity studies between reactor parameter control-variables;
  to recover energy during flow window modifications;
  to accommodate a desire for longer or shorter control blade sequence lengths;
  to reduce impact due to a leaking bundle of radioactive material;
  to minimize release of radioactive material from a leaking fuel bundle;
  to improve reactor parameter robustness;
  to change control blade group selection;
  to recover from changes in design due to licensing modifications;
  to perform alternate blade management;
  to store additional reactivity in following cycles for improved long term cycle economic efficiency; and
  to enhance overall operational flexibility.

Figure 4:
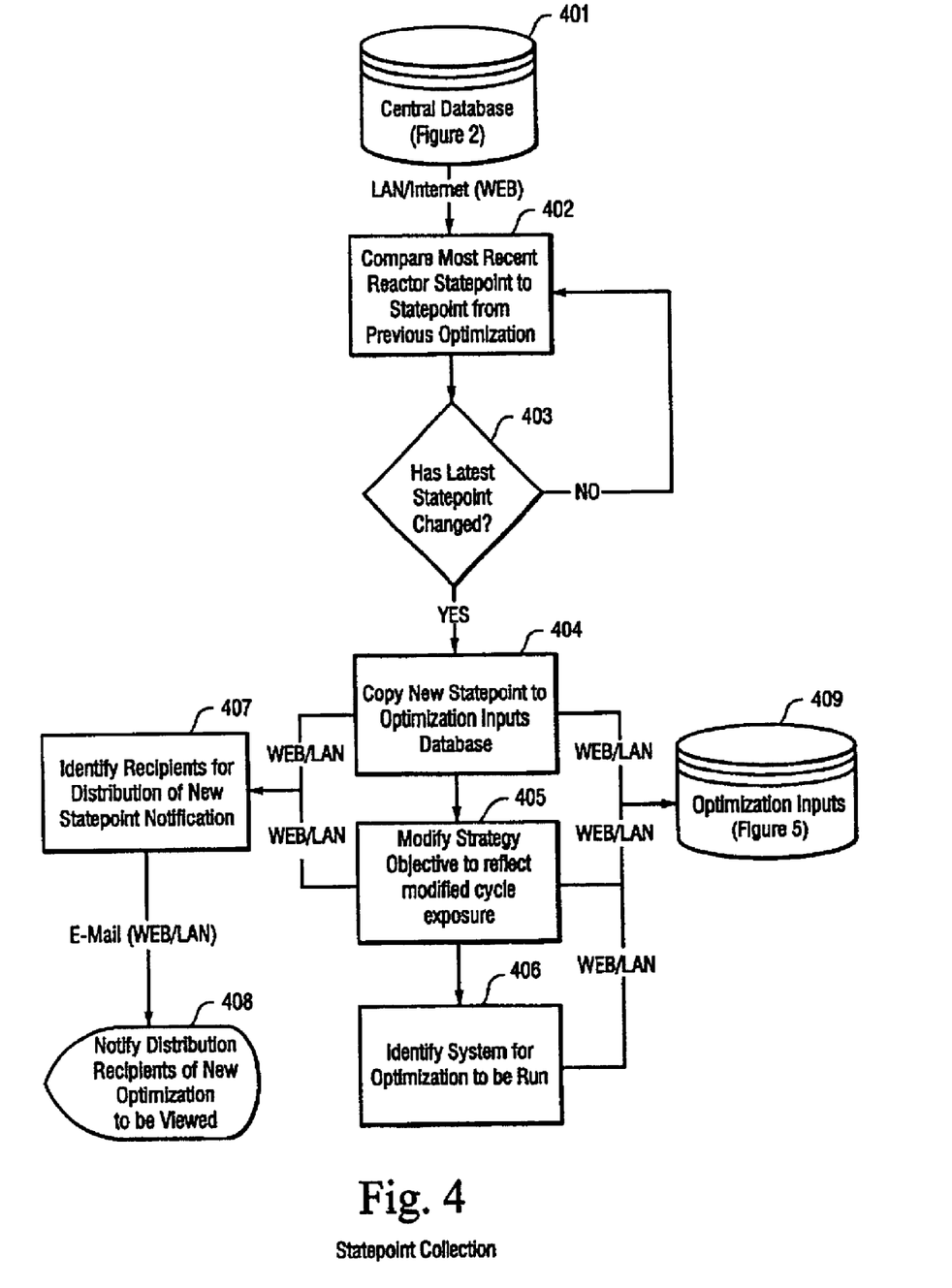
FIG. 4 is a flowchart illustrating an example process for communicating a notice of change in reactor state point and an intent to automatically re-optimize an initial strategy in accordance with the present invention.

FIG. 4 illustrates a flowchart of an example procedure for computing and communicating an automated modification of optimization inputs of a predefined operational strategy as a consequence of a change in the last state-point of an operating reactor plant. A new updated state-point is determined and, using data from the general database 401, a comparison 402 is performed to determine if the most recent updated state-point is different than the state-point obtained from a previously run simulation. If the latest state-point has not changed (403), state-point comparisons 402 are continued. If the state-point has changed (404), a copy of the new state-point is copied to Optimization Inputs Database 409. In addition, a small change is made to the operational strategy (405) to reflect the change in the starting exposure. With the strategy starting point update and the small modification made to reflect the new starting point time, a optimization request flag is set (406) to identify the system for an optimization request. Since this aspect of the present invention is automated and requires no human intervention, notification of the automated implementation is provided via e-mail 408 to a predetermined specified distribution of recipients 407.

Figure 5:
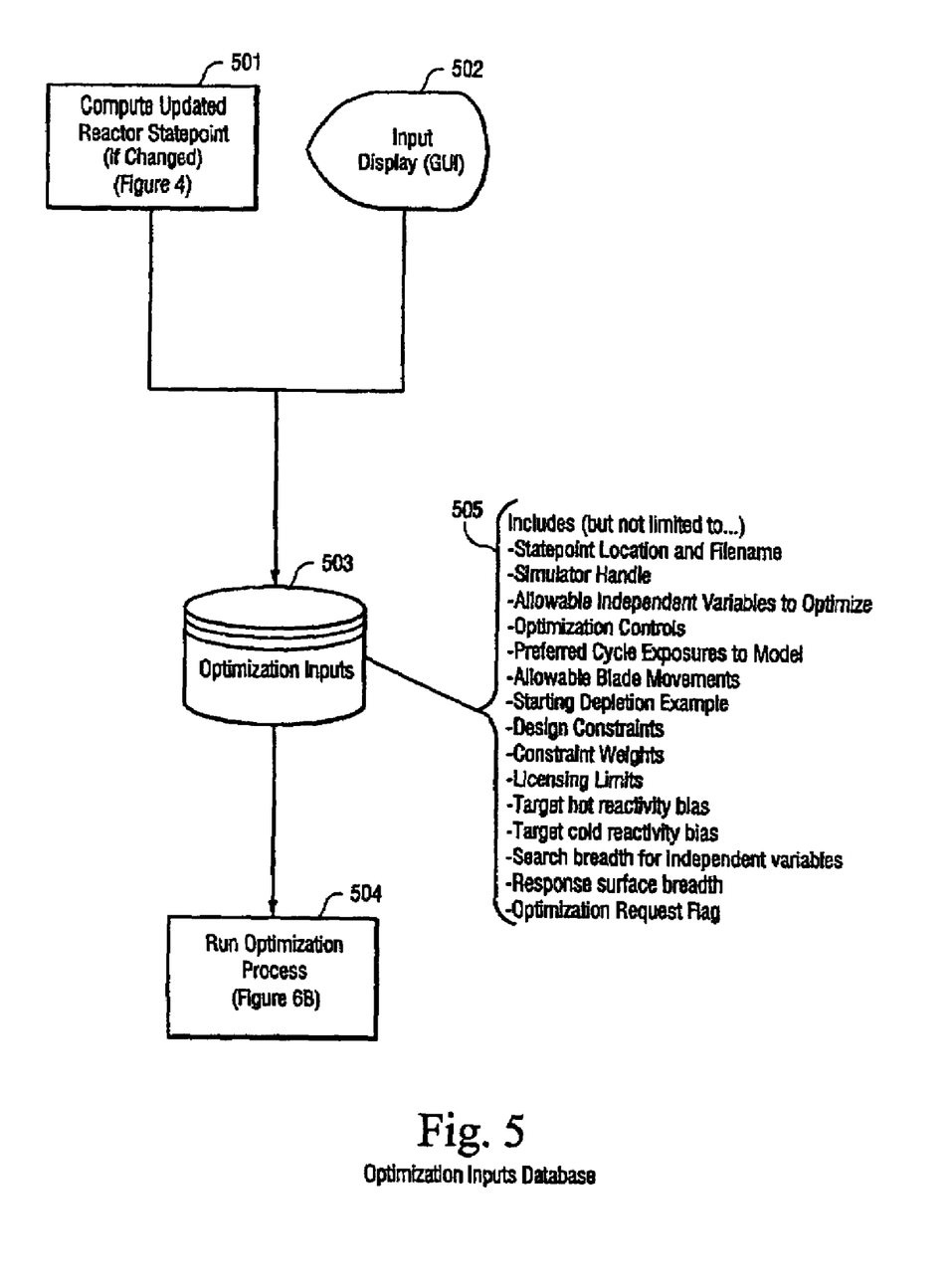
FIG. 5 is a block diagram illustrating exemplary information stored in an Optimization Inputs database of the present invention.

FIG. 5 is a block diagram illustrating example contents of an Optimization Input database (503) as a result of updated computed reactor state-point information (501) or manually input modifications. As described above Optimization Input database modifications may originate from the automated process loop operations 501 or the manual process loop operations via graphical user interface 502. For example, Optimization Inputs may include, but are not limited to data and parameters such as: state-point location, state-point filename, simulator model, allowable independent variables to optimize, optimization controls, preferred cycle exposure to be modeled, allowable blade movement ranges, starting depletion example, design constraints, constraint weights, licensing limits, target hot reactivity bias, target cold reactivity bias, search breadth for independent variables, response surface breadth, and optimization request flag. Each of these optimization inputs are stored in Optimization Input database 503 for use during Optimization process execution 504.

Figure 6A:
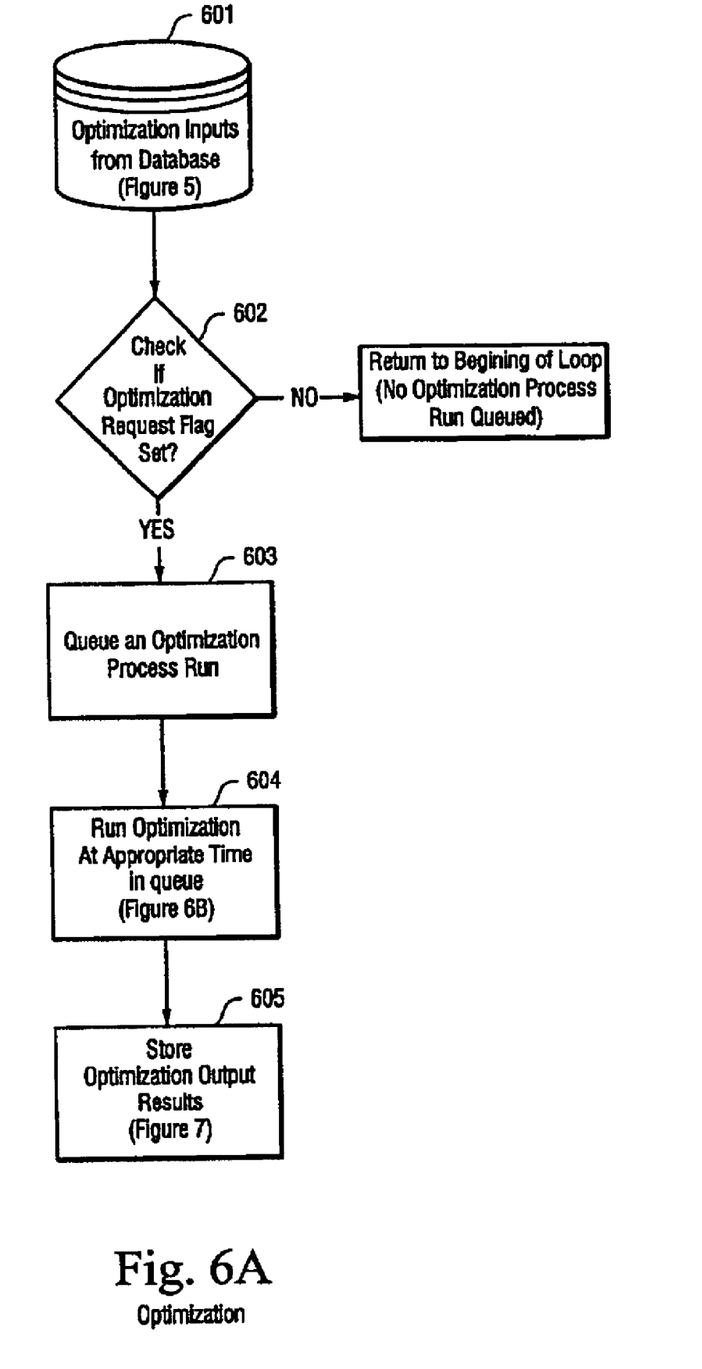
FIG. 6A is a flowchart illustrating a general overview of example software processing steps performed by the optimization process in accordance with the present invention.

FIG. 6A illustrates example steps performed by optimization software running on one or more of the host processors (10) for performing the control-variable optimization process of the present invention. When Optimization Inputs are initially placed in Optimization Inputs database, an optimization request flag is set. During an optimization process run, the values of the Optimization Inputs are obtained from the database (601) only after the request flag is tested (602) to determine if any changes have been made to the Optimization Inputs. If no changes to the Optimization Inputs have been made (i.e., request flag not set), the process reverts to the beginning entry point of the current manual or automatic loop (FIG. 1B). If changes have been made, the new values are obtained from the database (601) and an optimization computation process is queued to run on a host processor (603). Once the optimization process computations are completed (604), the results are stored to the general database (605).

Figure 6B:
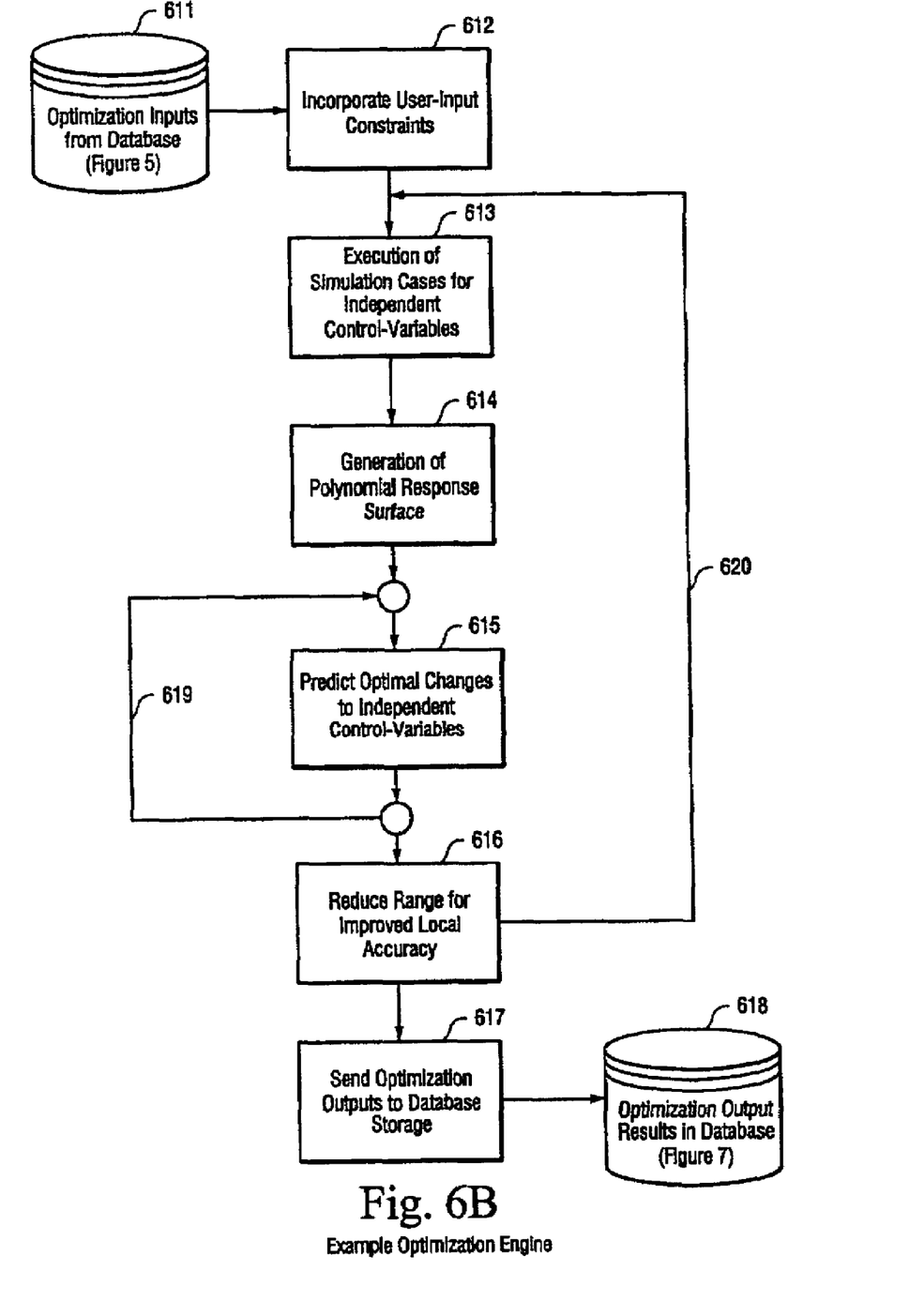
FIG. 6B is a flowchart illustrating processing steps of an example software optimization engine for performing optimization computations to determine preferred values for control-variables in accordance with the present invention.

FIG. 6B illustrates a flowchart of an example optimization process computational engine. At the outset, as indicated at block 612, the most recent simulation state-point (501) information and user-specified optimization constraints (505) are obtained from Optimization Inputs database 611. Next, at block 613, the processing of two reactor simulator cases is initiated for each independent variable in order to determine the functional relationship of dependent variables to a change in a specified independent variable. Next, at block 614, the generation of polynomial response surface is determined by solving for the coefficients of the polynomial. (The response surface transfer functions being normalized about the center-point to prolong usefulness during the optimization phase). Since there may be as many as several hundred independent variables, and a couple hundred thousand dependent variables for each independent variable, the above processing may potentially result in producing millions of polynomial response surface transfer functions.

Once the transfer function polynomial response surface is generated, it can be used to "predict" the response of the dependant variables for a given change in value of an independent variable 615. Consequently, computing simulated value changes for each of the independent variables provides an estimate of an optimum modification (i.e., change in quantitative value) which may be made to each independent variable. When such predictions indicate that an improvement exists relative to a previous iteration, the scenario is simulated using a reactor core operation simulator which may, for example, be a conventional core simulation program or process performed by one or more other host processors coupled to the network. A looping (619) of computing polynomial response surface predictions (615) and performing simulator calibrations/corrections is repeated until either: 1) the response surface becomes inaccurate, 2) a predetermined number of iterations is reached, or 3) until no further significant improvements to the computed solution are realized. Once loop 619 is exited, the range of the independent variable selection is reduced (616) and a new response surface is regenerated via processing "loop" 620. This larger response surface computation loop (620) is pursued until changes to an independent variable no longer improve the computed solution by a predetermined margin—which may be specified by optimization the user-input constraints. Once the optimization is complete, computed optimization output values (617) are stored in an Optimization Output Results database (618), which may be part of the general (central) database.

Figure 7:
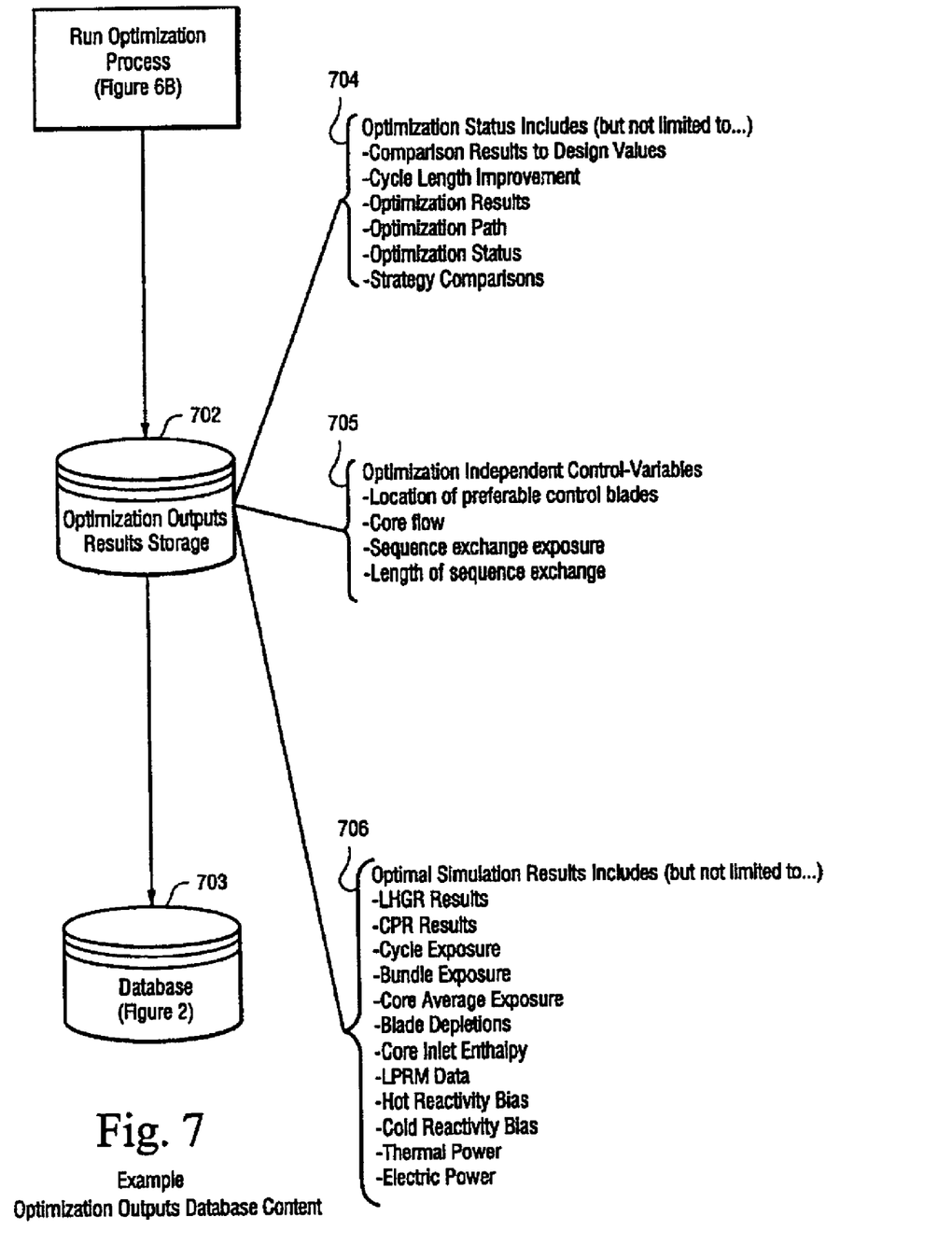
FIG. 7 is a block diagram illustrating exemplary information stored in an Optimization Outputs database of the present invention.

FIG. 7 is a block diagram illustrating example contents of information stored in an Optimization Output database 702, provide on a storage device in the system network. Three primary categories of optimization database contents are illustrated which include: 1) optimization status data 704, 2) optimization independent control-variables 705, and 3) resulting optimization dependent variable output predictions 706. The Optimization Status data 704 may include, but is not limited to, comparison results to design values, cycle length improvement, optimization results, optimization path, optimization status, and strategy comparisons. The Optimization independent Control-Variables 705 may include, for example, the location of the preferable control blades and equivalent blade groupings at all future requested exposures, the preferable core average flow at all future requested exposures, and the preferable sequence exchange exposure intervals. The Optimization Dependent variable output predictions, 706, may include (but are not limited to), for example, LHGR results, CPR results, cycle exposure, bundle exposure, core average exposure, blade depletions, core inlet enthalpy, LPRM data, hot reactivity bias, cold reactivity bias, thermal power, and electric power.

The system and method of the present invention as described above may significantly improve the economic efficiency of operating nuclear reactors by providing suggested specifications of the operational control-variables that maximize energy and cycle length while providing the same or greater design margins needed to perform safe and flexible operation. Other practical uses of the present invention may include, but are not limited to:

Continuous optimization based on continuously updated reactor state-points;
Optimization based on operating plant history;
Optimization based on response to changing operational requirements;
Continuous maintenance optimal projection;
Conversion of operating margin into energy or cycle length;
Conversion of energy or cycle length into operating margin;
Recovery from poor 3D simulation predictions;
Automatic updating of projections for use in next cycle design and licensing;
Energy storage during current cycle for following cycle fuel cycle efficiency improvements;
Reactor operator feedback on optimal operations recommendations;
Reactor operator feedback on sensitivity of all independent variables;
Ability to receive and optimize operational control-variables using exposure and/or location dependent constraints;
Remote access to centralized database;
Customer access to vendor hardware;
Secure access by customer user to customer specific data;
Ability to perform multiple solutions from varying constraints;
Determining economic cost of margin;
Extending reactor cycle length;
Improving reactor limit margin;
Recovering energy due to loss in reactor flow capability;
Ability to reduce number of required sequence exchanges;
Increasing length of a given sequence exchange interval;
Ability to respond to emergency conditions such as pump loss, leakage control, scram recovery, etc.;
Ability to respond to changes in licensing requirements of a nuclear plant; and
Comparing various optimization strategies.

The method of the invention presented herein and described above may be practiced using most any type of computer network or interconnected system of processors having sufficient processing speed and associated data storage capacity and is not necessarily intended to be limited to any particular type of data processor or network. Moreover, software elements of the present invention may be operative as one or more modules and may be embodied on a computer-readable medium for ease of transport between and/or installation on one or more host processors/computers in a networked environment. In addition, the method and system presented herein are applicable toward optimizing the operations of many different types of reactor plants, including but not limited to boiling water reactors (BWRs) and pressurized water reactors (PWRs).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of determining independent control variable values for a nuclear reactor under operation, comprising:
receiving state-point data for the operating nuclear reactor, the state-point data including current values for independent control variables and for dependent performance variables of the operating nuclear reactor; and
performing an optimization process on one of a computer and computer network based on the received state-point data to generate one or more independent control variable values.

2. The method of claim 1, further comprising:
receiving a change in at least one constraint of the nuclear reactor operation; and wherein
the performing step performs the optimization process on one of a computer and computer network based on the received state-point data and the at least one changed constraint.

3. The method of claim 2, further comprising:
executing the performing step in response to receiving state-point data that differs from previously received state-point data.

4. The method of claim 1, further comprising:
executing the performing step in response to receiving state-point data that differs from previously received state-point data.

5. The method of claim 1, further comprising:
repeating the receiving and performing steps throughout operation of the operating nuclear reactor.

6. The method of claim 5, further comprising:
executing the performing step in response to receiving state-point data that differs from previously received state-point data.

7. The method of claim 1, further comprising:
displaying at least a portion of the state-point data.

8. The method of claim 7, further comprising:
displaying at least a portion of results from the performing step.

9. The method of claim 1, further comprising:
displaying at least a portion of results from the performing step.

10. The method of claim 1, wherein the optimization process comprises:
first simulating nuclear reactor operation for sets of independent control variable values to produce associated sets of dependent performance variable values;
generating transfer functions based on the sets of independent control variable values and the sets of dependent performance variable values, the transfer functions representing functional relationships between the independent control variables and the dependent performance variables; and
determining a set of independent control variable values for possible use in operating the operating nuclear reactor using the transfer functions.

11. The method of claim 10, wherein the first simulating step comprises:
treating the independent control variable values and the dependent performance variable values in the state-point data as a base set of independent control variable values and a base set of dependent performance variable values, respectively;
generating, from the base set of independent control variable values, modified sets of independent control variable values associated with each independent control variable in a selected group of independent control variables; and
simulating nuclear reactor operation for each of the modified sets of independent control variable values to produce modified sets of dependent performance variable values.

* * * * *